Feb. 26, 1957 H. V. LICHTENBERGER ET AL 2,782,941
FOLLOW-UP MECHANISM
Filed March 12, 1954 6 Sheets-Sheet 1

INVENTORS
Harold V. Lichtenberger
Leonard J. Koch
by Roland A. Anderegger
Atty.

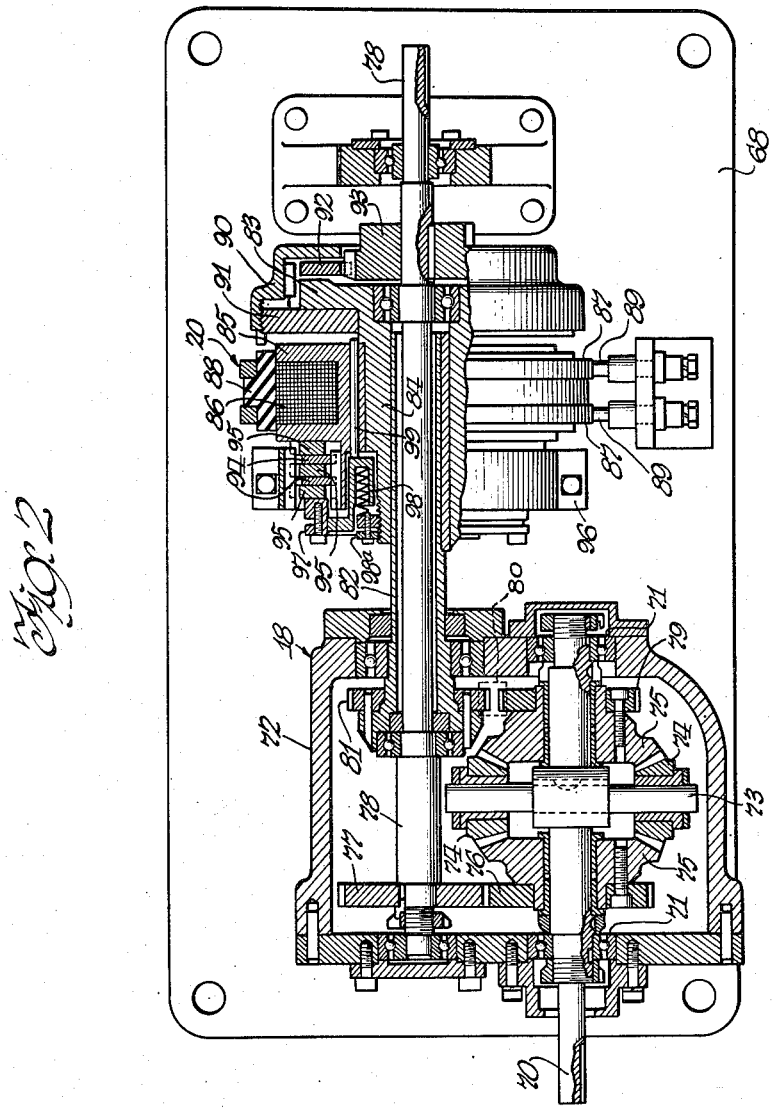

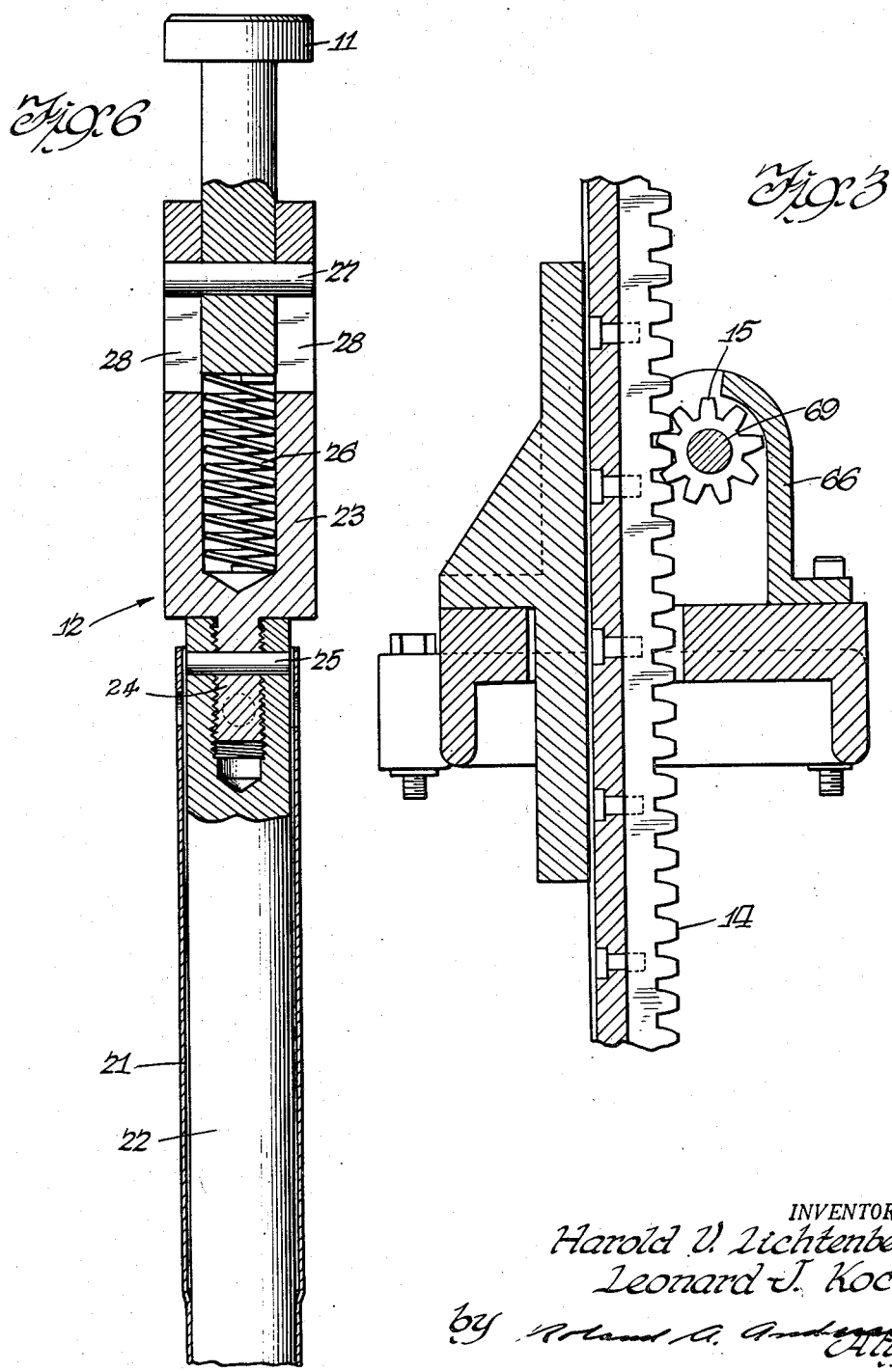

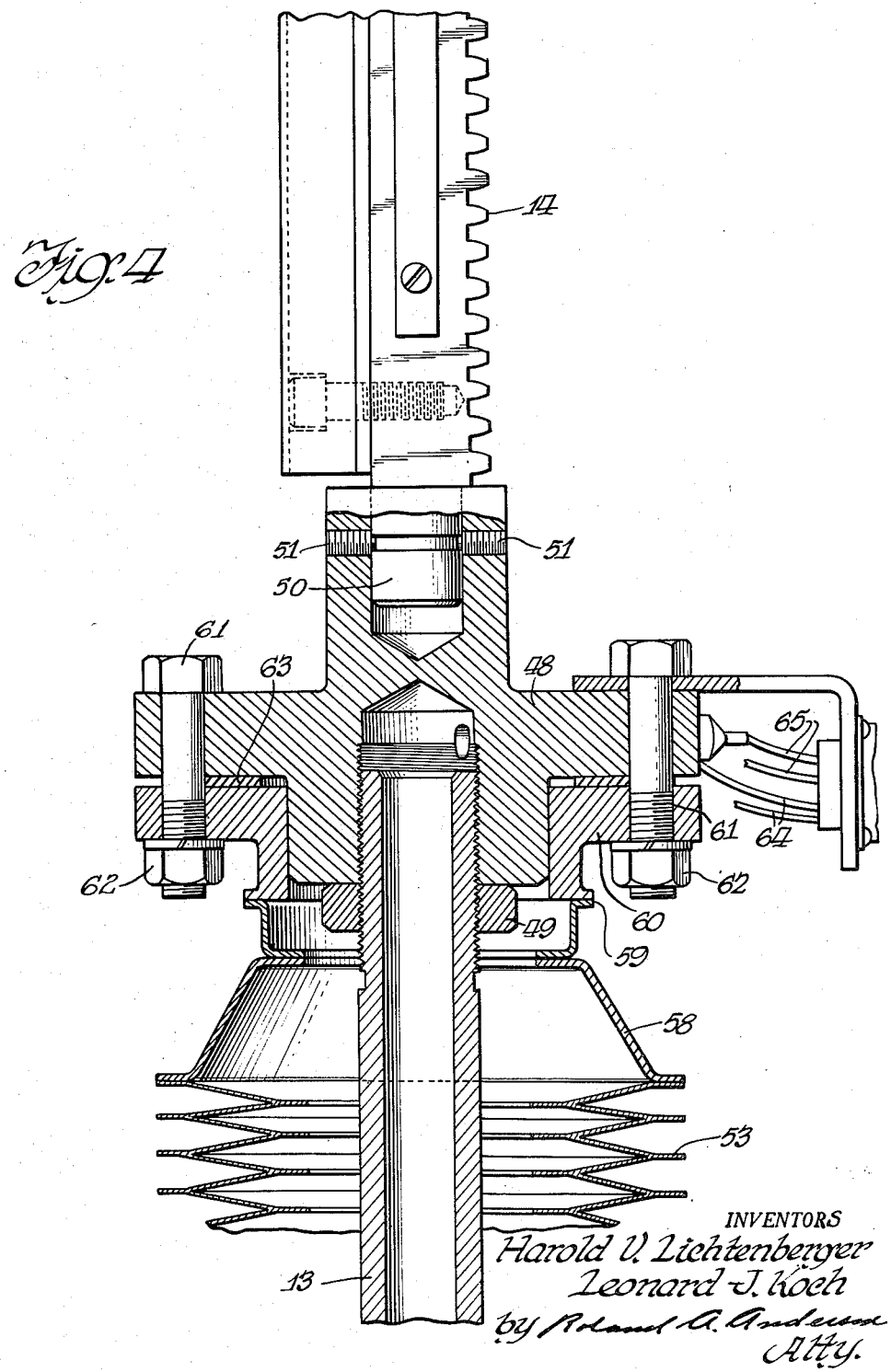

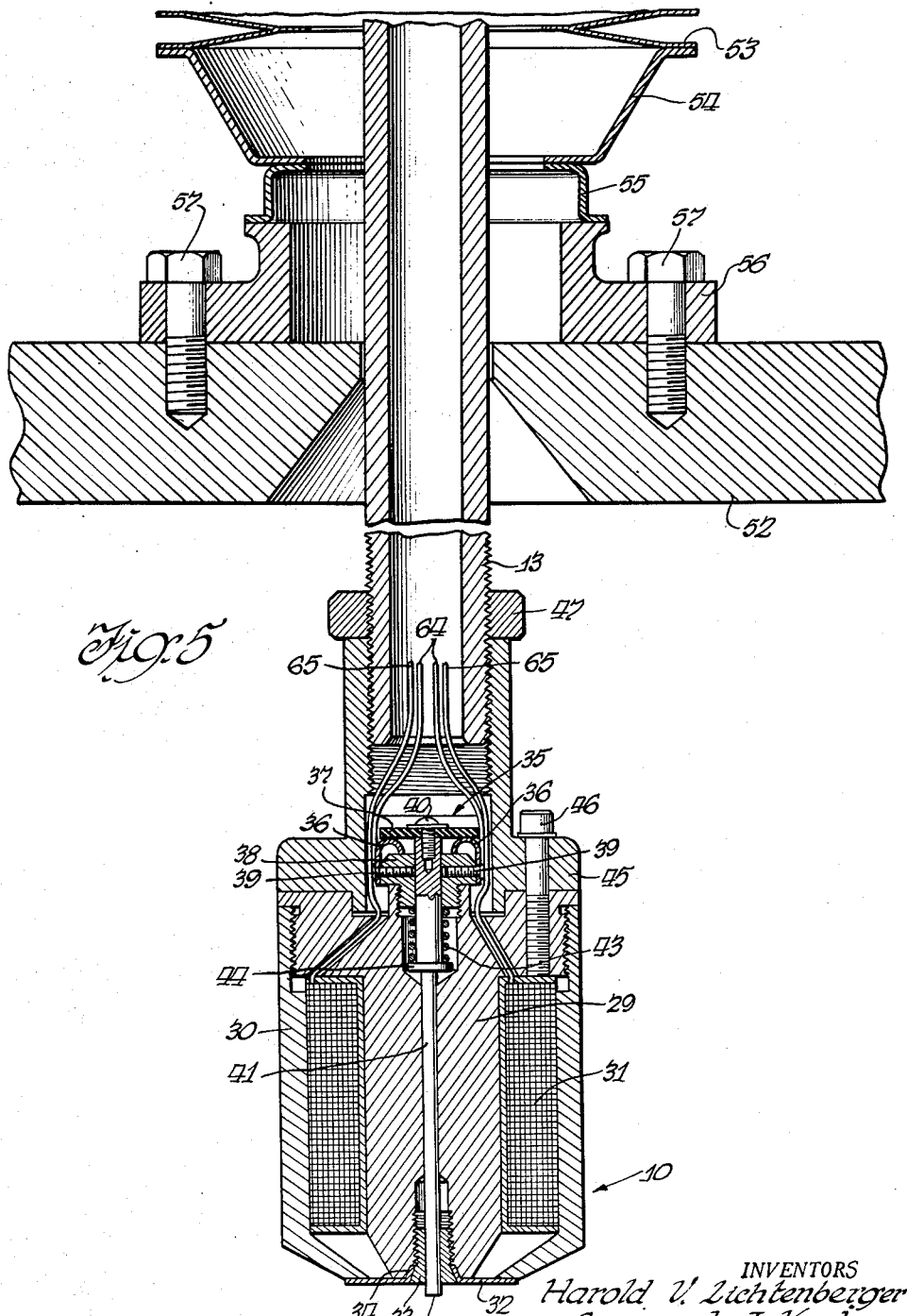

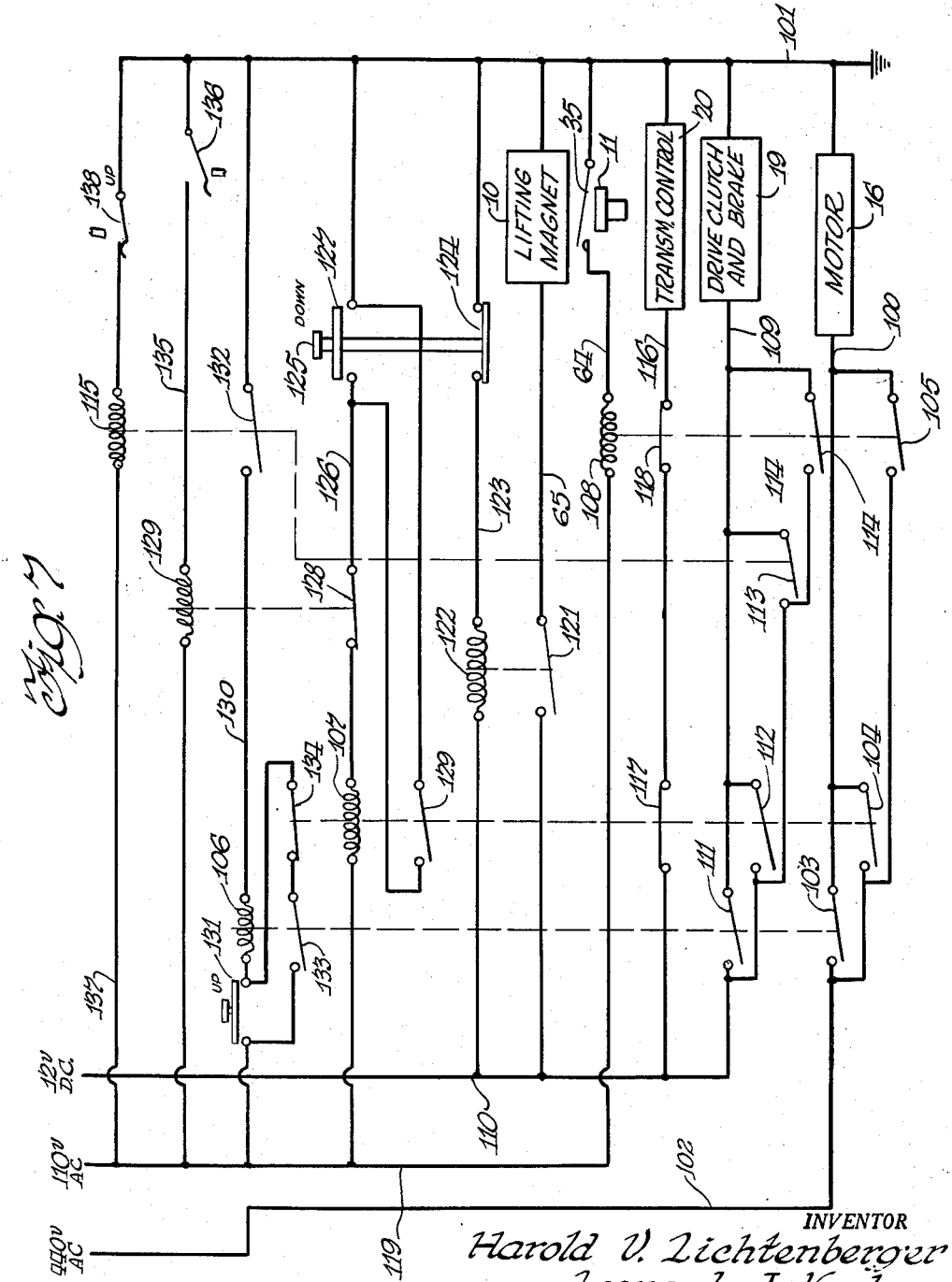

United States Patent Office 2,782,941
Patented Feb. 26, 1957

2,782,941

FOLLOW-UP MECHANISM

Harold V. Lichtenberger, Idaho Falls, Idaho, and Leonard J. Koch, Clarendon Hills, Ill., assignors to the United States of America as represented by the United States Atomic Energy Commission Application March 12, 1954, Serial No. 415,984

5 Claims. (Cl. 214—1)

This invention relates to a device for withdrawing a member from an apparatus and reinserting it in the apparatus.

In an apparatus such as a neutronic reactor it is possible to control the operation of the reactor by appropriately positioning one or more neutron-absorbing rods in the reactor. Such a rod may be vertical and may be lifted out of the reactor so that if the reactivity becomes too great the rod will be released and quickly fall back into the reactor. The difficulty with this arrangement is that the rod may tend to stick in the small passageway provided for it and thus not to reenter the reactor as quickly as required.

An object of the present invention is to provide an improvement in a device of the above type which will assure that the member or rod will not stick or become jammed as it drops.

Another object is the provision of an improved electromagnet forming part of a device for lifting an object.

Other objects will become apparent from the disclosure that follows.

In the drawings:

Fig. 2 is a horizontal sectional view taken on the line 2—2 of Fig. 1 and showing the transmission by which the device is driven in two directions;

Fig. 3 is a vertical sectional view taken on the line 3—3 of Fig. 1 and showing a pinion and rack;

Fig. 4 is an elevational view, partly in section, of the lower end of the rack and the upper end of a support tube;

Fig. 5 is a vertical sectional view of the lower end of the support and an electromagnet for holding a rod to be lifted;

Fig. 6 is a vertical sectional view of the upper end of the rod to be lifted and of the tube in which it is mounted; and Fig. 7 is a diagrammatic view showing circuits by which the various components of the novel device are interconnected for automatic operation.

Figure 1:
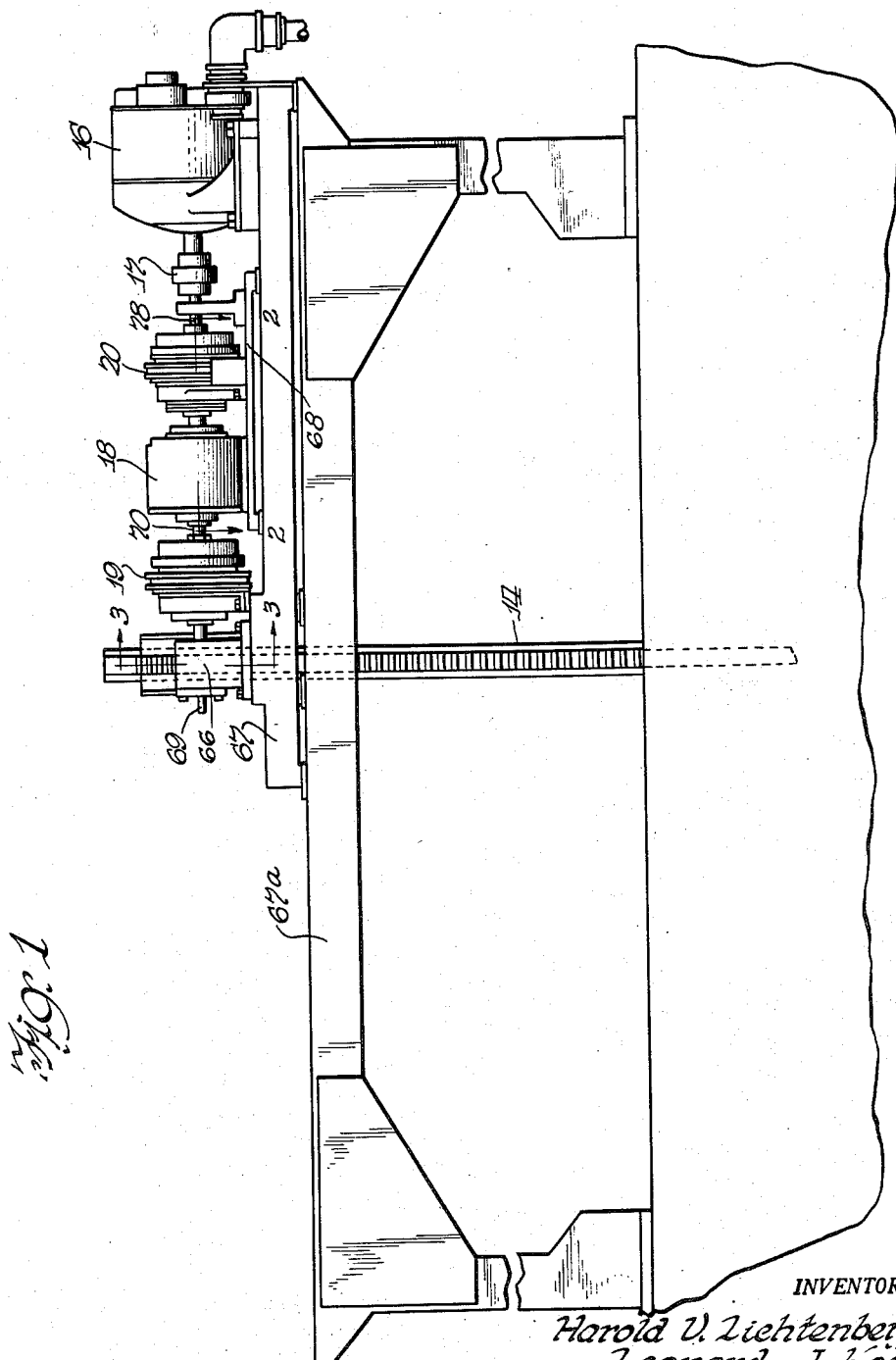
Fig. 1 is an elevational view of a portion of the device of the present invention.

Contact is established between a lifting magnet 10 (Fig. 5) and a soft iron head 11 (Fig. 6) on a safety rod 12. When the magnet 10 is energized and lifted, the safety rod 12 is lifted with it. The magnet is lifted by a tubular support 13 and a gear rack 14 (Figs. 4 and 5). The gear rack is lifted by a pinion 15 (Fig. 3) which is rotated by a motor 16 (Fig. 1) connected therewith through a coupling 17, a differential-gear transmission 18, and a driving clutch 19. When the safety rod 12 is being lifted out of a reactor (not shown), a transmission control 20 (Fig. 1) is actuated to make the transmission 18 cause the pinion 15 to be driven in the same direction as the motor 16 and at a relatively low speed.

When the safety rod 12 is to descend and reenter the reactor, the magnet 10 is deenergized, thus loosing its hold on the soft iron head 11 on the safety rod 12. The transmission control 20 is actuated so as to make the transmission 18 cause the motor 16 to drive the pinion 15 in the opposite direction to the motor and at a relatively high speed. Thus the rack 14, the tubular support 13, and the magnet 10 are caused to descend, following the freely falling safety rod 12. If, for example, the safety rod sticks in an aluminum tube 21 in which it is mounted, the magnet 10 will positively force the safety rod downward into the reactor.

As shown in Fig. 6, the safety rod 12 has an upper section 22 formed of stainless steel and an unshown section therebelow which is formed of a suitable neutron-absorbing material such as cadmium. The head 11 is slidably mounted in an aluminum bronze member 23 having a threaded shank 24 in engagement with a threaded opening formed in the upper end of the section 22. A pin 25 locks the threaded shank 24 in the section 22. The head 11 is held in the position shown in Fig. 6 in the member 23 by means of a coil spring 26 mounted in the member 23, the coil spring serving as a shock absorber. The head 11 is prevented from coming out of the member 23 by means of a pin 27 extending through the head 11 and having its ends slidable in vertical slots 28 formed in the member 23.

As shown in Fig. 5, the magnet 10 comprises inner and outer core members 29 and 30, a coil 31, and a disk 32 bridging an annular gap formed between the core members 29 and 30 at one end. The core members are formed of soft iron, and the disk, of stainless steel having low magnetic permeability. The disk 32 is secured to the inner core member 29 by means of a bolt 33 having a beveled head holding a beveled flange 34 on the disk 32 against the inner core member 29. The purpose of the disk 32 is to bring about instantaneous release of the safety-rod head 11 upon deenergization of the magnet 10 by providing a path for the residual flux between the core members 29 and 30. Thus the disk 32 is thick enough for this purpose, and yet it is thin enough so that when the magnet 10 is energized, the disk is an insufficient path for the flux, and thus the magnet is able to hold the safety-rod head 11.

Mounted at the upper end of the inner core member 29 is a switch 35 which comprises a pair of contacts 36 and a head 37 bridging the contacts. The contacts 36 are secured in spaced relation to an insulator 38 by means of screws 39 threaded into the insulator 38. The head 37 is secured by a screw 40 to the upper end of a rod 41 which is slidably mounted in the insulator 38 and the inner core member 29 and has a lower end 42 protruding beyond the disk 32 when the rod 41 is in the position shown in Fig. 5. The rod is held in this position by means of a coil spring 43 which surrounds a portion of the rod and acts between a shoulder 44 formed thereon and the insulator 38. When the rod 41 is in this position, the head 37 engages the contacts 36, causing the switch 35 to be closed. When contact is established between the head 11 of the safety rod 12 and the magnet 10, the safety-rod head 11 engages the lower end 42 of the rod 41 and lifts it, causing the head 37 to move away from the contacts 36 and the switch 35 to be opened.

The inner and outer core members 29 and 30 have a threaded connection with one another. The outer core member is secured to a fitting 45 by means of bolts 46, one of which is shown in Fig. 5. The fitting 45 has a threaded connection with the lower end of the tubular support 13 and is secured thereon by means of a lock nut 47. As shown in Fig. 4, the upper end of the tubular support 13 has a threaded connection with a fitting 48 and is secured thereto by means of a lock nut 49. The fitting 48 is secured to a projection 50 formed on the lower end of the rack 14 by means of set screws 51.

The tubular support 13 projects through an opening formed in a cover 52 for the reactor. A bellows seal 53 is provided around the tubular support 13 and has its lower end secured and sealed to the reactor cover 52 by means of rings 54, 55, and 56, the ring 54 being secured to the bellows seal 53 and the ring 55 being secured to the ring 54 and the ring 56 which is secured by screws 57 to the cover 52. The upper end of the bellows 53 is secured and sealed to the fitting 48 by means of rings 58, 59, and 60, the ring 58 being secured to the bellows seal 53, the ring 59 being secured to the rings 58 and 60, and the ring 60 being secured to the fitting 48 by means of bolts 61 and nuts 62. A seal 63 is clamped between the fitting 48 and the ring 60. Leads forming part of a line 64 are secured to the contacts 36 and rise through the tubular support 13 to the fitting 48 through which they exit. Leads forming part of a line 65 are connected with the coil 31 and go up to the tubular support 13 through the fitting 48 through which they exit.

As shown in Fig. 3, the upper end of the rack 14 is slidably supported in a bearing 66 which also rotatably mounts the pinion 15. The bearing is secured to a large platform 67, which is secured to a framework 67a positioned over the reactor and secured thereto. The platform 67 also provides a mounting for the motor 16 and the drive clutch 19 and carries a small platform 68 mounting the transmission 18 and the control 20. As shown in Figs. 1 and 3, the pinion 15 is keyed to a shaft 69 which is secured to the driven side of the clutch 19. The clutch 19 is so constructed that when the driving and driven sides thereof are not connected with one another, the driven side is secured against movement as by being locked against the housing of the clutch 19 so that the clutch serves as a brake. The driving side of this clutch is secured to a shaft 70 which, as shown in Fig. 2, forms part of the transmission 18 and is journaled in bearings 71 in a housing 72 for such transmission. A cross shaft 73 is secured to the shaft in transverse relation thereto and journals a pair of bevel gears 74 which mesh with a pair of bevel gears 75 journaled on the shaft 70. To one bevel gear 75 is secured a spur gear 76 which meshes with a spur gear 77 secured to one end of a driving shaft 78 which has its other end drivingly connected with the motor 16 through the coupling 17. To the other bevel gear 75 is secured a spur gear 79 which meshes with an idler gear 80 which in turn meshes with a spur gear 81 secured to a driving sleeve 82 journaled on the driving shaft 78. The spur gears 77 and 81 are intended to have a slightly larger number of teeth than the spur gears 76 and 79, respectively, and it is intended that the ratio of the teeth on gear 81 to those on gear 79 be slightly greater than the ratio of the teeth on gear 77 to those on gear 76. Thus, for example, the gears 81 and 79 have 45 and 44 teeth, respectively, and the gears 77 and 76, 50 and 49 teeth, respectively. The result is that when the control 20 secures the driving sleeve 82 to the driving shaft 78, the driven shaft 70 will be rotated in the same direction as the driving shaft 78 and at a relatively low speed, and that when the sleeve 82 is locked against movement, the driven shaft 70 will be rotated at a relatively high speed in the opposite direction to that of the driving shaft 78.

In the control 20 a nonmagnetic core 83 has a sleeve portion 84 by which it is secured to the driving sleeve 82 for rotation therewith. A magnetic body 85 is mounted on the sleeve portion 84 and carries a coil 86 which may be energized through current-collector rings 87 mounted on an insulator 88 surrounding the magnetic body 85 and brush contacts 89 in engagement with the current-collector rings. The nonmagnetic core 83 is keyed to a cap 90 to which a magnetic disk 91 is secured in a threaded connection. A clutch disk 92 is mounted between the cap 90 and the nonmagnetic core 83 and is keyed to a hub 93 secured to the driving shaft 78. Friction rings 94 are keyed to the magnetic body 85 and lie between friction rings 95 keyed to a brake cage 96 secured to the platform 68. A floating brake shoe 97 is urged by one or more coil springs 98 connected with a ring 98a secured to the sleeve portion 84 of the nonmagnetic core 83 so as to clamp the friction rings 94 and 95 against one another and thus to secure the magnetic body 85 to the brake cage 96. One or more rods 99 extend from the brake shoe 97 through the magnetic body 85 almost to the magnetic disk 91. When no current is flowing through the coil 86, the floating brake shoe 97 clamps the friction rings 94 and 95 against one another so as to lock the magnetic body 85 to the brake cage 96. The body 85 being secured to the nonmagnetic core 83 which is in turn secured to the driving sleeve 82, the latter sleeve is braked or held against movement. When current is applied to the coil 86, the disks 91 and 92 are attracted toward the magnetic body 85. Thus the disk 92 engages the nonmagnetic core 83 so that the driving sleeve 82 is locked to the driving shaft 78 by virtue of the keying of the disk 92 to the hub 93 on the driving shaft 78 and the securement of the nonmagnetic core 83 to the driving sleeve 82. As the disk 91 is pulled toward the magnetic body 85, it pushes the rods 99, causing them to act against the floating brake shoe 97 to make it release the frictional contact between the rings 94 and 95.

With reference to Fig. 7, the motor 16 is connected in a line 100 connected across a ground line 101 and across a line 102 at 440 volts A. C. Included in the line 100 are three normally open switches 103, 104, and 105, closed by energization of coils 106, 107, and 108, respectively. The driving clutch 19 is connected in a line 109 which is across the ground line 101 and a line 110 at 12 volts D. C. Included in the line 109 are four normally open switches 111, 112, 113, and 114 which become closed when coils 106, 107, 115, and 108 are energized, respectively. When no current is flowing in line 109 the clutch 19 does not transmit drive but the driven side thereof is secured against movement. The transmission control 20 is connected in a line 116 which is connected across the ground line 101 and the 12-volt line 110. Normally closed switches 117 and 118 are in the line 116 and are opened when the coils 107 and 108 are energized, respectively. The coil 108 and the switch 35 are in the line 64, which is connected across the ground line 101 and a line 119 at 110 volts A. C. The lifting magnet 10 is connected in the line 65 which is connected across the ground line 101 and the 12-volt line 110. A normally open switch 121 is in the line 65 and is of such construction that the switch opens in response to deenergization of a coil 122, but after opening it must be specially reset before it can close in response to energization of the coil 122. The coil 122 is in a line 123 which is connected across the ground line 101 and the 12-volt line 110. A switch 124 which is normally closed is operated by a down button 125, which is pushed for downward movement of the safety rod 12. The coil 107 is in a line 126 which is connected across the line 101 and the 110-volt line 119. In the line 126 are a normally open switch 127 controlled by the down button 125 and a normally closed switch 128 opened by energization of a coil 129. Energization of the coil 107 closes a normally open switch 129 which is connected across the terminals of the switch 127. The coil 106 is in a line 130 which is connected across the ground line 101 and the 110-volt line 119. In the line 130 are a normally open manual switch 131, which is closed for upward movement of the safety rod 12, and a normally open switch 132, which is closed by energization of the coil 115. A normally open switch 133 closed by energization of the coil 106 and a normally closed switch 134 opened by energization of the coil 107 are connected in series across the terminals of the manually operated switch 131. The coil 129 is connected in a line 135 which is connected across the ground line 101 and the 110-volt line 119. In the line 135 is a normally open switch 136 which is closed by movement of the lifting magnet 10 and its associated parts to a lowermost position in which the magnet engages the head 11 on the safety rod 12 when the latter is in its lowermost position. The coil 115 is in a line 137 which is connected across the ground line 101 and the 110-volt line 119. In the line 137 is a normally closed switch 138 which is opened by movement of the lifting magnet 10 and the safety rod 12 to the uppermost position.

Operation

Let it first be assumed that the safety rod 12 is in its lowermost position, that the lifting device is also in its lowermost position and it is desired to raise the safety rod 12 to extract it from the pile. In this assumed position the lifting magnet 10 is in contact with the safety rod 12 causing switch 35 to be open; coil 108 is therefore deenergized, and switch 118 has fallen back to its normally closed position. Switches 118 and 117 being closed, the transmission control 20 is energized, and the system is prepared for lifting the safety rod out of the pile. Switch 121 must first be manually closed to energize the magnet 10 if the operation preceding the assumed one was activated by depressing the down button 125. Depressing down button 125 would have opened switch 121 by deenergizing the coil 122, when contact 124 was broken. Next, the up switch 131 is closed, and current flows through the coil 106, since the switch 132 is closed because of energization of the coil 115 due to the closed condition of the up-limit switch 138. The coil 106 closes the switch 133, and current continues to flow through the coil 106 in spite of reopening of the switch 131 after actuation thereof. Energization of the coil 106 closes the switches 111 and 103, thereby causing drive to be transmitted through the clutch 19 and the motor 16 to be driven. The pinion 15 now rotates so as to move the rack 14, the tubular support 13, and the lifting magnet 10 upward, and energization of the magnet makes the safety rod 12 follow the magnet upward. When the upper limit of movement has been reached, the up-limit switch 138 is opened, causing deenergization of the coil 115, opening of the switch 132, deenergization of the coil 106, and opening of the switches 111 and 103, resulting in interruption of drive through the clutch 19 and locking of the driven side thereof and the pinion 15 against movement and stopping of the motor 16. Now the rack 14, the tubular support 13, the magnet 10, and the safety rod 12 are held in the uppermost position. If, when the parts are in the uppermost position, the up switch 131 is closed, nothing will happen, because the coil 106 cannot be energized, because the switch 132 is open, because the up-limit switch 138 is open.

If the safety rod 12 is now to be brought downward back into the reactor, the down button 125 is pushed, causing the switch 127 to be closed and the switch 124 to be opened. Opening of the switch 124 causes deenergization of the coil 122, opening of the switch 121, and deenergization of the magnet 10. Thus the safety rod 12 is released from the magnet 10 and falls back into the reactor. Closing of the switch 127 acts as previously indicated to energize the coil 107 and thus to open the switch 117 and close the switches 112 and 104, resulting in setting of the control 20 for downward drive of the transmission 18, the connection of the clutch 19 for the transmission of drive therethrough, and driving of the motor 16. The result is that the pinion 15 immediately rotates to move the magnet 10 downward after the safety rod 12 which has just been released. If the falling safety rod becomes stuck or slowed up in the tube 21, the safety rod will be forced downward by the descending lifting magnet when it overtakes the safety rod. If the safety rod now moves downward past the region of the tube 21 where it sticks, it will again fall freely and move away from the magnet 10. This is possible, because the switch 121 through which energization of the magnet 10 is controlled has not closed upon closing of the switch 124 after release of the down button 125. When the safety rod 12 and the magnet 10 reach their lowermost positions, the down-limit switch 136 will be closed, as previously described, resulting in energization of the coil 129, opening of the switch 128, deenergization of the coil 107, and opening of the switches 112 and 104, resulting in interruption of drive through the clutch 19 and stopping of the motor 16. When the magnet 10 and the safety rod 12 are in their lowermost positions, closing of the switch 127 and opening of the switch 124 through actuation of the down button 125 have no effect, since the switch 128, controlling the coil 107, is open, because the down-limit switch 136 is closed.

If the magnet 10 and the safety rod held thereagainst through energization of the magnet are moving upward, and for some reason the safety rod drops away from the magnet, the magnet will reverse its direction and move downward after the safety rod, because movement of the safety rod 12 and its head 11 away from the magnet closes the switch 35, resulting in energization of the coil 108, opening of the switch 118, and actuation of the control 20 to shift the transmission 18 to produce reverse rotation of the pinion 15. When contact is reestablished between the magnet 10 and the safety-rod head 11, either at the lowermost position of the safety rod or at some intermediate position at which the lifting magnet may have overtaken the safety-rod head because of sticking of the safety rod in the tube 21, the lifting magnet will reverse its direction and move upward because of opening of the switch 35, deenergization of the coil 108, and closing of the switch 118, resulting in actuation of the control 20 to reverse the transmission 18. Through all of this the lifting magnet 10 will stay energized so that the safety rod will stay with the magnet 10 once contact has been established between the safety-rod head and the magnet, because the switch 121 has not been opened since the switch 124 has not been opened. The intention is to limit the invention only within the scope of the appended claims:

What is claimed is:

1. An electromagnet comprising inner and outer members of high magnetic permeability forming between them an annular space open at one end, an electric coil positioned in the annular space, a disk of low magnetic permeability bridging the gap between the members at said one end of the annular space, the disk being thin enough to constitute an insufficient flux path across the gap between the members upon energization of the coil and thus to provide for the passage of sufficient flux through an object of high magnetic permeability when in abutment with the disk to enable the object to be held against the disk, the disk being thick enough to provide an adequate path for magnetic residual flux to dissipate quickly across the gap between the members upon cessation of energization of the coil and thus to enable quick release of the object from the members, an element slidably mounted in the inner member, and resilient means causing an end of the element to extend beyond the side of the disk away from the inner and outer members, engagement of the object with the disk causing the element to retract against the resilient means to a position of flushness of said end of the element with the disk.

2. In a lifting apparatus; an electromagnet comprising inner and outer members of high magnetic permeability forming between them an annular space open at one end, an electric coil positioned in the annular space, and disk of low magnetic permeability bridging the gap between the members at said one end of the annular space, the disk being thin enough to constitute an insufficient flux path across the gap between the members upon energization of the coil and thus to provide for the passage of sufficient flux through an object of high magnetic permeability when in abutment with the disk to enable the object to be held against the disk, the disk being thick enough to provide an adequate path for magnetic residual flux to dissipate quickly across the gap between the members upon cessation of energization of the coil and thus to enable quick release of the object from the members; an element slidably mounted in the inner member; and resilient means causing an end of the element to extend beyond the side of the disk away from the inner and outer members, engagement of the object with the disk causing the element to retract against the resilient means to a position of flushness of said end of the element with the disk; means for moving the electromagnet in a direction toward the object or in a direction away from the object; and means for causing the last mentioned means to be operated so as to move the magnet only toward the object when the object is out of contact with the disk, said means including an electric circuit including a metallic head fastened to the end of the slidable element remote from said end of the disk and an electrical contact engaged by the metallic head when said end of the slidable element protrudes from the disk and being out of engagement with the metallic head when the said end of the slidable element is flush with the disk.

3. A lifting apparatus for an object, comprising a device for holding the object, means actuable for moving the holding device upward or downward, an electric switch operable by the release of the object from the holding device, and means responsive to the operation of the switch for actuating said moving means to cause the holding device to move downward after the object to remake contact therewith.

4. A lifting apparatus substantially as defined in claim 3, comprising in addition, means for manually actuating said moving means to move the holding device downward, and means conditional upon the prior operation of said manual means for causing said holding device to continue to move downward after contact is remade with the object.

5. A lifting apparatus substantially as defined in claim 3, comprising, in addition, means for manually actuating said moving means to move the holding device upward, and means conditional upon prior operation of said manual means for causing said holding device to move upward after contact is remade with the object.

References Cited in the file of this patent

UNITED STATES PATENTS

| 266,216 | Sniffen | Oct. 17, 1882 |
| 1,667,766 | Bing | May 1, 1928 |
| 2,095,499 | Hodgson et al. | Oct. 12, 1937 |
| 2,675,718 | Finney | Apr. 20, 1954 |

FOREIGN PATENTS

| 206,130 | Great Britain | Mar. 20, 1924 |